United States Patent [19]
Nakanishi

[11] Patent Number: 5,774,347
[45] Date of Patent: Jun. 30, 1998

[54] APPARATUS AND METHOD FOR SUPPLYING POWER TO AN ELECTRONIC DEVICE REQUIRING A MONENTARY SUPPLY OF EXTRA HIGH POWER

[75] Inventor: Hideaki Nakanishi, Machida, Japan

[73] Assignee: International Business Machines Corporation, Armonk, N.Y.

[21] Appl. No.: 909,971

[22] Filed: Aug. 12, 1997

Related U.S. Application Data

[63] Continuation of Ser. No. 595,895, Feb. 6, 1996, abandoned.

[30] Foreign Application Priority Data

Feb. 6, 1995 [JP] Japan .................................. 7-017711

[51] Int. Cl.$^6$ ............................................. H02M 3/335
[52] U.S. Cl. ....................................................... 363/21
[58] Field of Search ................................ 363/16, 20, 21

[56] References Cited

U.S. PATENT DOCUMENTS

| | | | |
|---|---|---|---|
| 4,146,832 | 3/1979 | McConnell | 323/17 |
| 4,326,245 | 4/1982 | Saleh | 363/79 |
| 4,612,610 | 9/1986 | Farnsworth et al. | 363/26 |
| 4,791,544 | 12/1988 | Gautherin et al. | 363/21 |
| 5,297,014 | 3/1994 | Saito et al. | 363/21 |
| 5,581,451 | 12/1996 | Ochiai | 363/21 |
| 5,612,858 | 3/1997 | Weinmeier et al. | 363/21 |
| 5,619,404 | 4/1997 | Zak | 363/21 |
| 5,652,700 | 7/1997 | Thai et al. | 363/21 |

*Primary Examiner*—Matthew V. Nguyen
*Attorney, Agent, or Firm*—Daniel E. McConnell; Anthony N. Magistrale

[57] ABSTRACT

Disclosed is a compact power supply unit that prevents an electronic device from being shut down even when due to an in-rush current phenomenon the electronic device requires a supply of power that is extraordinarily greater than that which is needed for normal operation. A CV area where constant voltage feedback control is performed on an output terminal voltage until it reaches a level $V_1$ is continued until an output current value is $I_1$. Then, constant current feedback control is performed with the output current $I_1$ until the output terminal voltage falls to $V_2(<V_1)$. Further, constant current feedback control is performed with the output current $I_2$ ($<I_1$) in the area where the output terminal voltage is lower than $V_2$ (more specifically, in a battery charging area).

5 Claims, 5 Drawing Sheets

APPARATUS AND METHOD FOR SUPPLYING POWER TO AN ELECTRONIC DEVICE REQUIRING A MONENTARY SUPPLY OF EXTRA HIGH POWER

The application is a continuation, of application Ser. No. 08/595,895, filed Feb. 6, 1996, now abandoned.

TECHNICAL FIELD

The present invention relates to a power supply unit and a power supply method for supplying power to an electronic device; and in particular to a power supply unit and to a power supply method for an electronic device, such as a portable computer, that can be operated by either an external power source or an incorporated battery.

BACKGROUND

In line with the latest developments in the technique, portable personal computers (or notebook computers) that are compactly made and light, and for which portability is taken into account are widely used.

Figure 1:
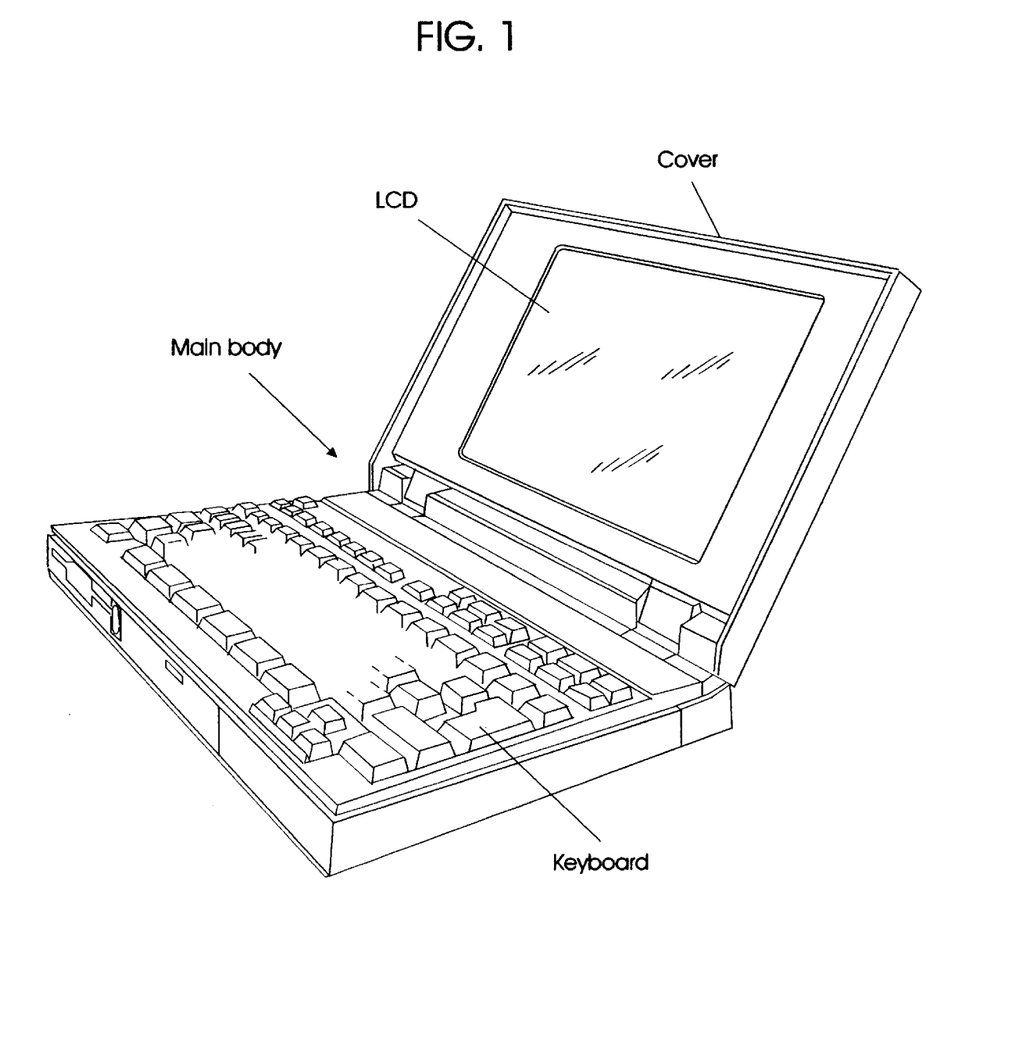
FIG. 1 is a diagram showing the outline of a conventional notebook computer.

FIG. 1 is a diagram illustrating the outline of a common notebook computer. The notebook computer has a main body and a cover that at its rear edge side is so coupled with the main body by a hinge that it is rotatable. The main body includes internally a system board, on which a CPU, a memory and various I/O controller chips are mounted, a CD-ROM drive pack, and a hard disk drive (HDD) pack (not shown). On the top surface of the main body is provided a keyboard by which a user can input characters. On the inside face of the cover is mounted a liquid crystal display (LCD) that serves as a display means for displaying input data and the results of programs that are executed. The LCD is a thin display device that has a small power consumption and that comprises a plurality of liquid crystal devices, which transmit light only when a voltage is applied, that are arranged in a matrix. Since liquid crystal itself does not emit light, a light source (not shown), which is called a "blacklight", is so provided behind the LCD that it irradiates the display contents.

Since a packaged incorporated batteries (hereafter also referred to as "battery packs") are provided for most of the notebook computers that are presently sold on the market, and as these computers can thus be used at sites where external AC power sources (generally, commercially available power sources) are not available, their portability is ensured. With the object of enabling recycling, rechargeable batteries, such as NiCd (nickel-cadmium) and NiMH (nickel-hydrogen) batteries, are usually employed as incorporated batteries for notebook computers (in general, an incorporated battery is referred to as a "battery pack" wherein are packaged a plurality of battery cells that are connected in series and in parallel).

Figure 2:
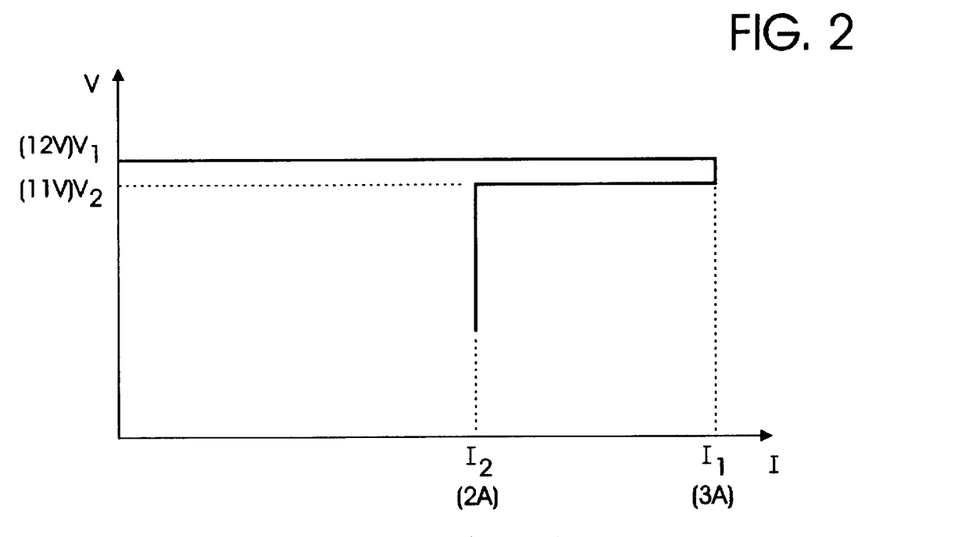
FIG. 2 is a schematic diagram showing the background arrangement of a power supply system for a notebook computer of FIG. 1.

FIG. 2 is a diagram illustrating the arrangement of a conventional power supply system in a notebook computer 100 (hereafter referred to simply as a "system") that has a charging type battery pack 10. A DC/DC converter 40 for the system 100 receives in parallel the outputs from an output terminal 41a, which is for an external AC power source, and from an output terminal 42a, which is for a battery pack 30. As switches 43 and 44 which are disposed along respective power lines 45 and 46, are opened and closed, either power source 10 or power source 30 supplies power for a system load 50 in the system 100. The AC power source is connected to the DC/DC converter 40 via an AC/DC adaptor 10, which converts an AC current into a DC current that the system can use. The DC/DC converter 40 supplies a constant power voltage for the system load 50, and more specifically, drops the output voltage (e.g., 20 V) of the AC/DC adaptor 10 and the output voltage (7.4 V to 15 V) of the battery 30 to a voltage level (ordinarily, 5 V or 3.3 V) that is proper for the system load 50, and keeps a constant voltage level. The AC/DC adaptor 10 and the battery 30 are detachably connected to the system 100 at the terminal portions 41 and 42.

The power supply for the system 100 and the charging/discharging of the battery 30 can be controlled by opening and closing the switches 43 and 44, as is described above. That is, when the switch 43 is rendered on, a DC voltage from the AC/DC adaptor 10 is applied to activate the system 100. When both of the switches 43 and 44 are turned on, the battery 30 can be charged by a DC voltage from the AC/DC adaptor 10. When the switch 44 is turned on and the switch 43 is turned off, the system 100 can be activated (or the battery 30 can be discharged) with the battery voltage. The control for the opening and the closing of the switches 43 and 44 is closely related to the control of operation modes, such as the charging and the discharging (or the full discharging) of the battery 30; however, as this is not the subject of the present invention, and a detailed explanation for it will not be given.

Figure 3:
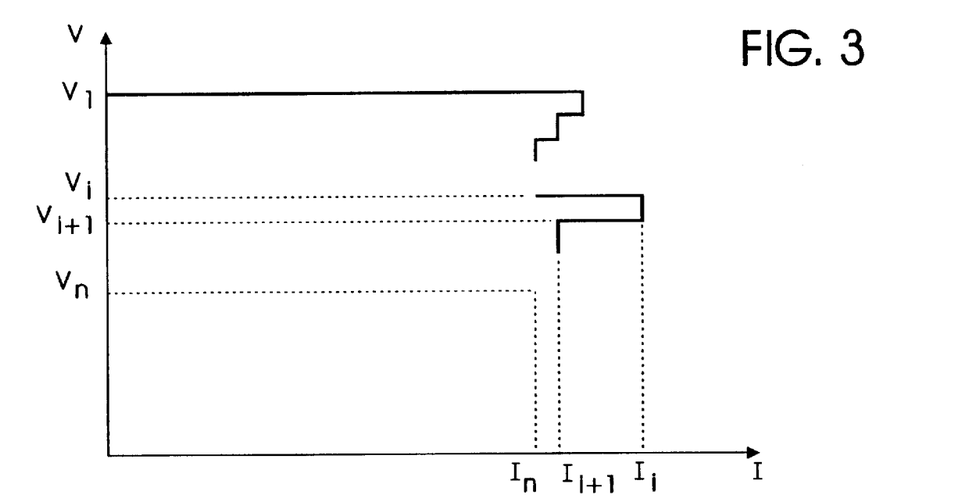
FIG. 3 is a graph of a current-voltage curve of an output characteristic of an AC/DC adaptor that supports the charging operation for a battery used in the notebook computer of FIG. 1.

When the system 100 is to be powered on, generally, the AC/DC adaptor 10 can output a current whose quantity is equivalent to the consumed power quantity of the system load 50, while keeping a constant voltage level. This is called a constant voltage (CV) characteristic. One of the features of the AC/DC adaptor 10 for a charging type battery is that it operates even when there is a constant current, i.e., it has a CVCC characteristic. The CC characteristic is derived from the charging characteristic of a NiCd battery and a NiMH battery for which charging can be performed with a constant current (more specifically, the battery is charged with a constant current, and as the charging progresses, the battery voltage rises until it reaches a certain peak, after which it gradually falls). Therefore, as is shown in FIG. 3, the AC/DC adaptor 10 is operated in the CV mode for activation of the system 100, while for the charging of the battery 30 the AC/DC adaptor 10 is operated in the CC mode, wherein the output current is kept being constant. In this case, the voltage ($V_{CV}$) at the output terminal of the AC/DC adaptor 10 in the constant voltage area is 20 V, for example, and the output current ($I_{CC}$) in the constant current area is 2A. The maximum power of the AC/DC adaptor 10 is 40 W at point P.

It is preferable that the AC/DC adaptor, one of the accessories for the notebook computer, is also compactly made in order to enhance the portability of the notebook computer. The volume (or the size) of the AC/DC adaptor normally depends on the quantity of the power that is to be outputted. The mounting area in the AC/AC adaptor case is enlarged in consonance with the output, and a heat discharge means is required as the amount of generated heat increases due to internal loss (ordinarily, the conversion efficiency from an alternating current to a direct current is about 80% and the remaining 20% is heat loss). In order to reduce the size of the AC/DC adaptor, a decrease in the quantity of the output power is the quickest and most effective method. For example, as is shown in FIG. 3, the constant voltage area should be changed from 20 V to 12 V (the maximum power is 24 W).

It is assumed that even when the power that is supplied by the AC/DC adaptor 10 is reduced, it will not affect the normal operation of the notebook computer 100. Recently, the components (i.e., circuitry items, such as controller chips that are mounted on the system board and installed input/output devices) of the system load 50 are designed and manufactured while taking power conservation into consideration, and the power consumption of the notebook computer 100 during normal operation is constant and steady at about 15 W to 20 W. In this case, no problems will occur if the voltage level $V_{CV}$ in the CV area is reduced to 12 V.

At the time when the system 100 is to be powered on, however, the situation differs from that for normal operation. Since, for example, the blacklight unit of the liquid crystal display is generally of a cold-cathode type, a voltage (e.g., 500 V to 600 V), which is much greater than that which is required for normal operation, must be momentarily applied in order for the first electron to be emitted when the blacklight is turned on (an excessive current (an in-rush current) flows through the system load 50), and a power of 35 W and 40 W is required. A small AC/DC adaptor that has a CV area of 12 V, as is shown in FIG. 3, has a maximum supplied power of only 24 W, which is insufficient for the activation of the blacklight, and accordingly, the system 100 can not be powered on with this adaptor. As the blacklight unit is the main component of the notebook computer 100, and its replacement is not easy, when a reduction in the size of the AC/DC adaptor is contemplated, the inclusion of a so-called kickback characteristic that can sufficiently cover the in-rush current is inevitable.

Further, in case that an input/output device which needs the in-rush current in the CC operational mode, not in the CV operational mode, is mounted in the system 100, a power for supply shortage occurs during the charging of the battery 30, for example, so that the system 100 is shut down accidentally. The occurrence of such an un-anticipated event will cause the loss of data in a main memory which is not yet saved, and further, will cause hardware malfunctions and software errors in the system 100.

SUMMARY OF THE INVENTION

According to the present invention, a power supply unit, which controls an output terminal voltage and an output current, comprises: voltage control means for keeping the output terminal voltage at a first voltage value $V_1$ in an area where the output current is changed up to a first current value $I_1$. A first current control means for keeping said output current within a range of said first current value $I_1$ and a second current value $I_2$ where $I_2$ is less than $I_1$ when said output terminal voltage is within the range of said first voltage value $V_1$ and a second voltage value $V_2$ where said second voltage value $V_2$ is less than the first voltage value $V_1$. A second current control means for keeping the output current at the second current value $I_2$ in an area where the output terminal voltage is lower than the second voltage value $V_2$.

BRIEF DESCRIPTION OF THE DRAWINGS

FIG. 7(a)–7(c) are diagrams showing equivalent circuits in a constant current feedback control means of the AC/DC adaptor of FIG. 4.

DETAILED DESCRIPTION OF THE PREFERRED EMBODIMENT

Figure 4:
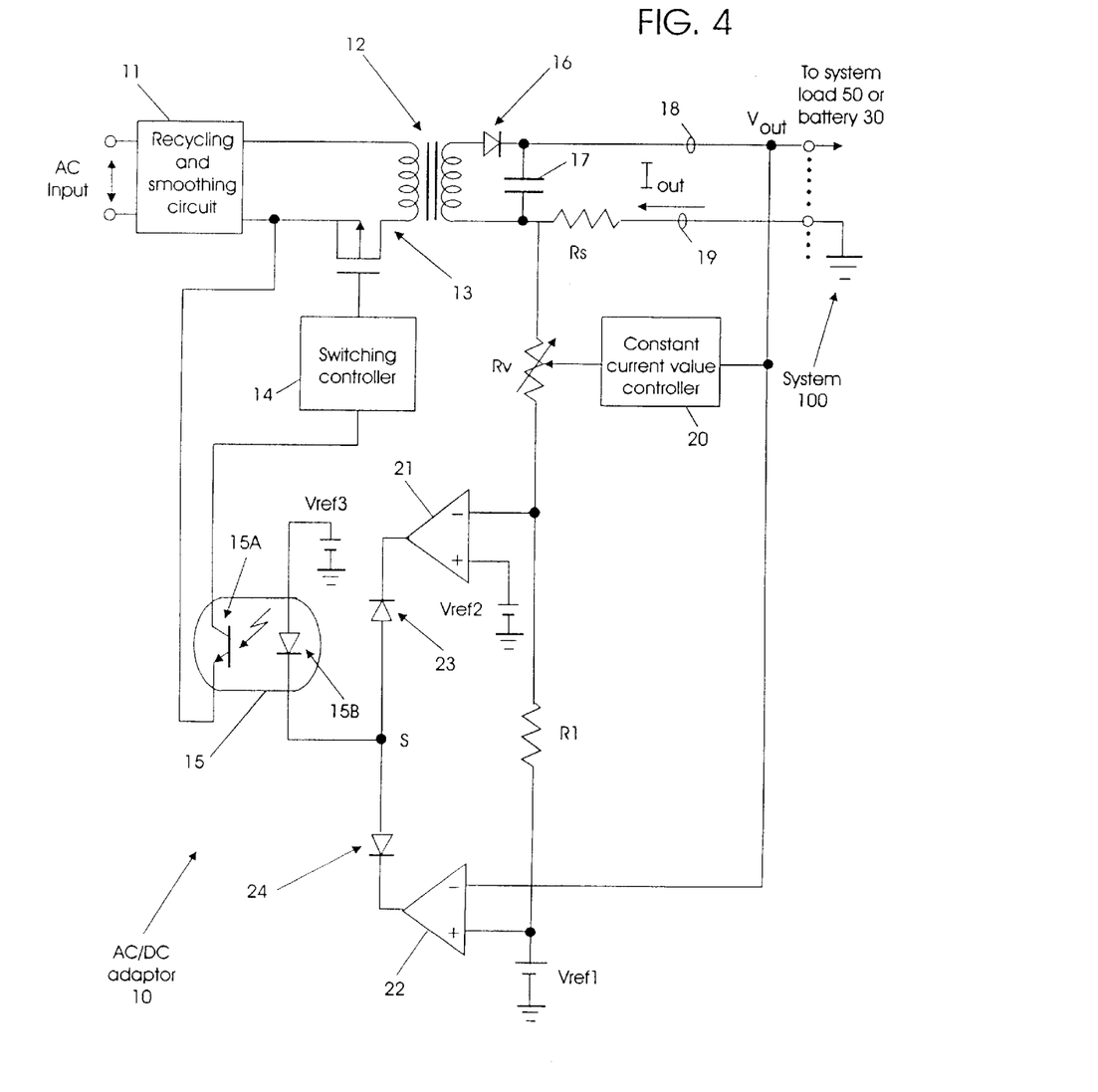
FIG. 4 is a diagram showing the internal arrangement of an AC/DC adaptor that embodies the present invention.

Referring to FIG. 4, the schematic diagram of a AC/DC adaptor 10 is according to the present invention is shown. The AC/DC adaptor includes a rectifying and smoothing circuit 11 rectifies and smooths an alternating current from an external AC power source (usually, a commercially available power source). A MOS FET switch 13 for AC generation and an input-side coil of a transformer 12 are connected in series to the output terminal of the rectifying smoothing circuit 11. A voltage that is applied to the input side coil of the transformer 12 is controlled by a duty ratio of the switch 13 (i.e., the ratio of the ON time of the switch 13). The ON/OFF operations of switch 13 is controlled by a switching controller 14, which is comprised, for example, of a PWM (Pulse Width Modulation) circuit or a resonance circuit. The switching controller 14 can control the duty ratio of the switch 13 by changing either a pulse width or a pulse interval in consonance with the output of a photocoupler 15, which will be described later.

The output-side coil of the transformer 12 is connected to power lines 18 and 19 via a smoothing circuit that comprises a diode 16 and a capacitor 17. The power line 18, which serves as a positive side terminal of an AC/DC adaptor 10, is coupled with a system load 50 or a battery 30 in a system 100. The voltage level at the power line 18 is hereafter referred to as output terminal voltage $V_{out}$ of the AC/DC adaptor 10. The power line 19, which serves as the negative terminal of the AC/DC adaptor 10, is grounded in the system 100. A current that flows across the power line 19 by virtue of its being grounded is hereafter referred to as output current $I_{out}$ of the AC/DC adaptor 10.

A differential amplifier 21 receives reference voltage $V_{ref2}$ as a cutoff voltage at its non-inversion side input terminal, while the inversion side input terminal receives a current at the power line 19 after the voltage level is divided by current detection resistor $R_S$, variable resistor $R_V$, and voltage-dividing resistor $R_1$. The differential amplifier 21 provides a negative output that is consonant with output current $I_{out}$. A differential amplifier 22 receives a voltage across the power line 18 at its inversion side input terminal, and reference voltage $V_{ref1}$ at its non-inversion side input terminal, and provides a negative output that is consonant with output terminal voltage $V_{out}$.

The outputs of the differential amplifiers 21 and 22 are transmitted via respective backflow prevention diodes 23 and 24, which are inversely connected to each other and are OR-coupled at point S, and the result is inversely forwarded to a light emitting device 15B of the photocoupler 15. The light emitting device 15B is designed with a so-called photo diode, and electromotive force $V_{ref3}$ is applied. Thus, when the negative output of at least one of the differential amplifiers 21 and 22 has exceeded a predetermined value, a sink current that corresponds to the output occurs at point S and an electric charge passes across the photo diode 15B. The photo diode 15B emits light in a quantity that is equivalent to the sink current. A light receiving device of a photocoupler 15A is constituted by a so-called photo transistor, and shows an ON resistance in consonance with the received light quantity. Thus, the photocoupler 15 totally amplifies the outputs of the differential amplifiers 21 and 22 and transmits the results to the switching controller 14. The switching controller 14 then turns on or off the switch 13 at a duty ratio that is proportional to the output of the photocoupler 15.

That is, the closed loop, which is provided with the current detection resistor $R_S$, the variable resistor $R_V$, the differential amplifier 21, the diode 23, the photocoupler 15, the PWM controller 14, the switch 13, the transformer 12, the diode 16 and the capacitor 17, serves as a negative constant current feedback control means. The closed loop, which is provided with the differential amplifier 22, the diode 24, the photocoupler 15, the PWM controller 14, the switch 13, the transformer 12, the diode 16 and the capacitor 17, serves as a negative constant voltage feedback control means.

The AC/DC adaptor 10 that incorporates the constant current and constant voltage feedback control systems is operated in the CVCC mode, as is well known by one having ordinary skill in the art. More specifically, when the output current $I_{out}$ is lower than a predetermined value (constant current value $I_{CC}$ in the CC area), the output (i.e., a sink current) of the differential amplifier 21 becomes substantially zero, the constant current feedback control means does not function, and only the constant voltage feedback control means functions. The AC/DC adaptor 10 is thus operated in the CV mode. When the output current $I_{out}$ has reached a predetermined value (i.e., $I_{CC}$), the output (i.e., a sink current) of the differential amplifier 21 begins to increase, and current feedback is performed. The output voltage $V_{out}$ then begins to decrease and the output (sink current) of the differential amplifier 22 becomes substantially zero, and only the constant current feedback control means functions, so that the AC/DC adaptor 10 is operated in the CC mode.

An especially unique feature of the AC/DC adaptor 10 according to the present invention is the incorporation of a constant current value controller 20. The constant current value controller 20 is a control circuit that alters the output current $I_{CC}$ of the AC/DC adaptor 10 in the CC operational mode. Since the constant current feedback control means is not activated until the output current of the AC/DC adaptor 10 reaches $I_{CC}$ (as is described above), the constant current value controller 20 substantially has a function to define the operational range of the constant voltage feedback control means.

The constant current value $I_{CC}$ in the CC operational mode is determined by resistances $R_1$, $R_S$ and $R_V$ of the circuitry components, and the voltage value $V_{ref1}$ in the AC/DC adaptor 10. According to the well known physical rule, expression (1) is established for the relationship between parameters.

Expression (1):

$$I_{th} + R_S = \frac{R_V}{R_1 + R_V} V_{ref1}$$

In expression (1), $R_1$, $R_S$ and $V_{ref1}$ denote fixed values that are established by a kind of design choice, and only $R_V$ is a variable. It would therefore be understood that the constant current value $I_{CC}$ can be changed by varying the resistance value of the variable resistor $R_V$.

When, for example, $R_V$ is set as in expression (2), the constant voltage feedback control means is activated (i.e., it is operated in the CV mode) within the range of the output current $I_{out}$ of 0[A] to $I_1$. When the output current $I_{out}$ reaches $I_1$, the constant current feedback control means begins to perform the CC operation whereby the output current $I_{out}$ is kept as $I_1$. Similarly, when $R_V$ is set as in expression (3), the constant current feedback is performed with $I_{out}=I_2$.

Expression (2):

$$R_S = \frac{I_1 + R_S + R_1}{V_{ref1} - I_1 + R_S}$$

Expression (3):

$$R_S = \frac{I_2 + R_S + R_1}{V_{ref1} - I_2 + R_S}$$

In this embodiment, the constant current controller 20 is connected in parallel to the power line 18 in order to constantly monitor the output terminal voltage $V_{out}$, and varies the resistance at the variable resistor $R_V$ so as to control the current value $I_{CC}$ (see subject divisions B and C).

It would be understood by one having ordinary skill in the art that the constant current value controller 20 can be designed and produced by using a well known technique. Further, in FIG. 4, the voltage dividing resistance $R_1$ is about 2 kΩ and the variable resistance $R_S$ is about 0.5 Ω, with both resistances being provided to reduce the power loss, and $R_V$ is a variable resistance that can be adjusted in the range of from 100 Ω to 200 Ω. The reference voltage $V_{ref1}$ need only be approximately 2.5 V.

Figure 5:
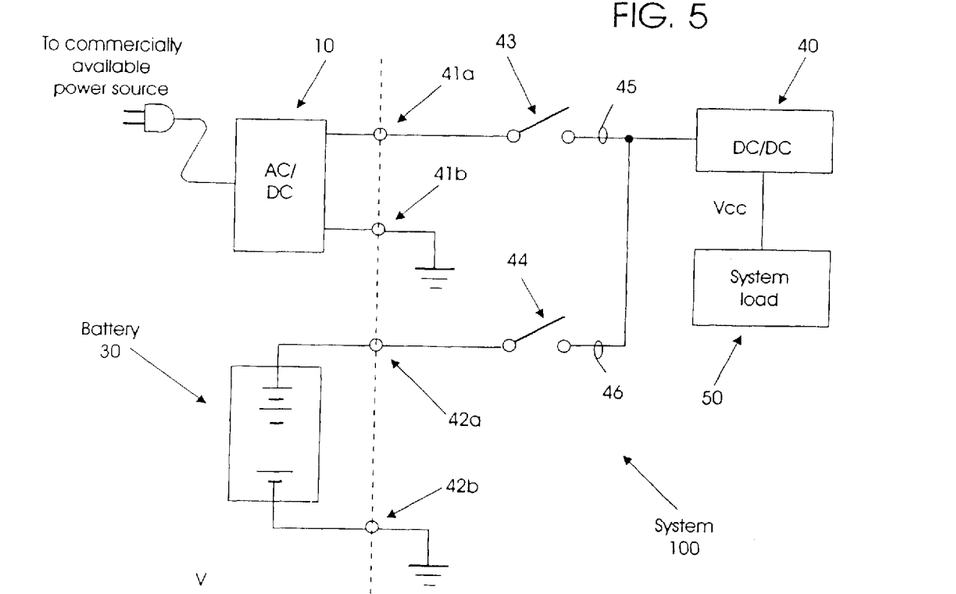
FIG. 5 is a graph diagram of a current-voltage characteristic of the AC/DC adaptor of FIG. 4 in one mode of operation.

According to the present invention, therefore, as is shown in FIG. 5, the CV area continues where the output terminal voltage is fed back to a constant voltage until the output current value reaches $I_1$. Constant current feedback is performed with the output current $I_1$ until the output terminal voltage falls to $V_2(<V_1)$, and further constant current feedback is performed at the output current $I_2(<I_1)$ in an area where the output terminal voltage is lower than $V_2$ (more specifically, in a battery charging area). Both the CV and the CC processes are reversible. When the operation begins in the CC area where the output current value is $I_2$ (when the charging of the battery 30 is begun), the processes are performed in inverted order. The maximum output of an AC/DC adaptor that has the current-voltage characteristic that is shown in FIG. 5 is $V_1I_1$. This exceeds the maximum output $V_1I_2$ of the adaptor when it possesses the CVCC characteristic for power saving, and reaches sufficient supplying power to turn on the blacklight unit of an LCD, for example. The supply of such an excessive current occurs momentarily at the time the blacklight is turned on, and the operation is performed only in a small area between $V_1$ and $V_2$ and is immediately returned to the CVCC operation for power saving. In other words, since heat generation that may accompany an extraordinarily large power output is not commonly encountered, the same countermeasure can be applied for heat discharge by the AC/DC adaptor as that which is employed for the CVCC characteristic for power saving.

Figure 6:
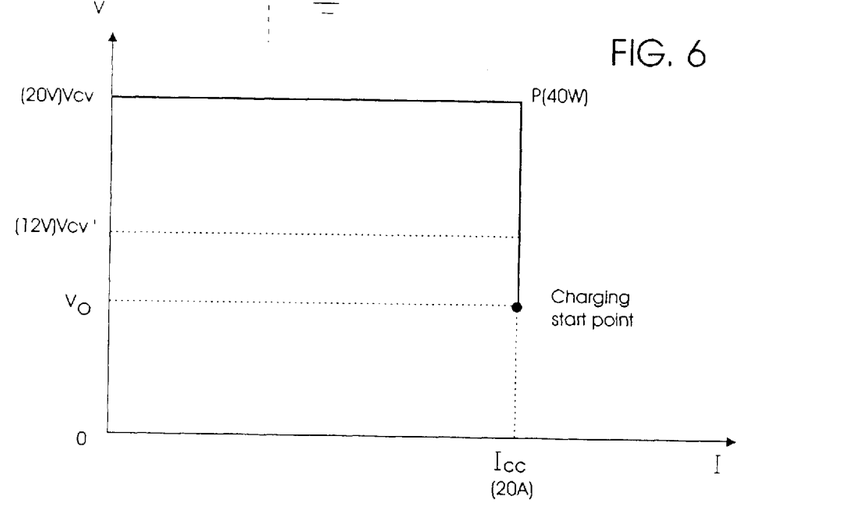
FIG. 6 is a graph of a current-voltage curve for the AC/DC adaptor of FIG. 4 in another mode of operation.

In addition, as is shown in FIG. 6, according to the present invention, since the CC value for the output current can be constantly kept as $I_i$ with an output terminal voltage of between $V_i$ and $V_{i+1}$, the kickback characteristic is held not only in the CV area, where the system 100 is driven, but also in the CC area, where the battery 30 is being charged. Therefore, the in-rush current that occurs in the area $V_i$ to $V_{i+1}$ can be coped with.

According to the present invention, as the reference current value is variable (or programmable) in consonance with the output terminal voltage, it is relatively easy to change the constant current value in the CC operational mode from $I_2$ to $I_1$.

The other objects, features, and advantages of the present invention will become obvious during the course of the following detailed explanation that is given while referring to the embodiment and the accompanying drawings of the invention.

B. First operation of the present invention

Since the arrangement of the AC/DC adaptor 10 has been explained in article A, the output characteristic of the AC/DC adaptor 10 will now be described in subject divisions B and C.

As is described above, the constant current value controller 20 is a control circuit that changes the constant current value $I_{CC}$ while the constant current feedback control is active. In this embodiment, the constant current value controller 20 includes a control table, as is shown in Table 1. Upon the detection of $V_{out}$, the constant current value controller examines the control table and reads a corresponding value for the variable resistance $R_V$, and then adjusts $R_V$ so that it has a desired value. According to Table 1, the constant current value controller 20 adjusts the variable resistance $R_V$ so that it has a value that is acquired by expression (2) in the range of $V_2 < V_{out} V_1$, and so that it has a value that is acquired by expression (3) in the range of $V_{out} V_2$.

TABLE (1)

| Output Terminal Voltage $V_{out}$ | Resistance $R_v$ |
|---|---|
| $V_2 < V_{out} \leq V_1$ | $\dfrac{I_1 + R_s + R_1}{V_{refl} - I_1 + R_s}$ |
| $V_{out} \leq V_2$ | $\dfrac{I_2 + R_s + R_1}{V_{refl} - I_2 + R_s}$ |

Since the output current $I_{out}$ is kept low by the impedance of the system load 50 during the normal operation of the system 100, only the constant voltage feedback control means functions to keep the output terminal voltage $V_{out}$ at $V_1$. The output current $I_{out}$ in this period is varied depending on the power consumed by the system 100. Since the output current $I_{out}$, however, is normally stable in the range of $I_2$ or below, the constant current feedback control means does not function.

For activation of the system 100, an excessive supply of power is momentarily required to turn on the blacklight of the LCD. In this case, since the output terminal voltage $V_{out}$ is $V_1$, according to the control table the constant current value controller 20 keeps $R_V$ at a value that is acquired by expression 1. Therefore, even if the output current $I_{out}$ exceeds the value $I_2$, the constant current feedback control means is not activated, and the output current increases until it reaches the value $I_1$ while the output terminal voltage $V_{out}$ is kept by the constant voltage feedback control means. As a result, the AC/DC adaptor 10 can supply the maximum power of $V_1I_1$ to the system load 50 and the blacklight can be thereby turned on. The extraordinary power output $V_1I_1$ is required only at the time of activation and the status is immediately shifted to the constant state for which the output power is lower. No problem occurs with the heat generation that accompanies the supply of an extraordinarily elevated supply of power.

Further, since during the charging of the battery 30 the output terminal voltage $V_{out@y}$ is kept low in consonance with the terminal voltage at the battery 30, the constant voltage feedback control means is not activated, and the constant current feedback control means is operational instead. In this case, as the output terminal voltage $V_{out}$ has the value $V_2$ or lower, according to the control table the constant current value controller 20 adjusts $R_V$ so that it has a value that is acquired by expression (3). In the CC area where the charging of the battery 30 is to be performed, feedback control is carried out for the output current $I_{out}$ at the value level $I_2$. As the output is smaller than that acquired in the CC mode at the value level $I_1$, no problem with heat generation arises.

It would be understood by one having ordinary skill in the art that when the constant current value controller 20 is operated according to the control table shown in Table 1, the output of the AC/DC adaptor 10 possesses the current-voltage characteristic that is shown in FIG. 5. When, for example, $V_1=12[V]$ and $I_2=2[A]$, the AC/DC adaptor 10 can supply sufficient power for the normal operation of the system 100 and for the charging of the battery 30. When $I_1=3[A]$, the maximum power of the AC/DC adaptor 10 is 36[A], so that it can supply sufficient power relative to the in-rush current that occurs when the blacklight of the LCD is turned on. When $V_2=11[A]$, the CC area where the extraordinarily large output is included is terminated momentarily, and no problem with heat generation arises.

The constant current value controller 20 that has a control table such as the one that is shown in Table 2 will now be considered.

TABLE (2)

| Output Terminal Voltage $V_{out}$ | Resistance $R_v$ |
|---|---|
| • | • |
| • | • |
| • | • |
| $V_i < V_{out} \leq V_{i+1}$ | $\dfrac{I_i + R_s + R_1}{V_{refl} - I_i + R_s}$ |
| • | • |
| • | • |
| • | • |

In consonance with Table 2, the constant current value controller 20 adjusts $R_V$ so that it has a value that is acquired by expression (4) in the range of $V_i < V_{out} V_{i+1}$.

Expression (4):

$$R_S = \frac{I_i + R_S + R_1}{V_{refl} - I_i + R_S}$$

The AC/DC adaptor 10 therefore possesses the CC characteristic of n levels of the output terminal voltage $V_{out}$ in the range from $V_1$ to $V_n(V_1 > V_n 0$; where n is a positive integer), and is operated in the CC mode at the output current value $I_1$ in the range of $V_i < V_{out} V_{i+1}$. It would be understood by one having ordinary skill in the art that when the constant current value controller 20 is operated according to the control table shown in Table 2, the output of the AC/DC adaptor 10 reflects a current-voltage characteristic, as is shown in FIG. 6.

If the in-rush current occurs in the system load 50 in the range of $V_i < V_{out} V_{i+1}$, by setting $R_V$ of the AC/DC adaptor 10 while taking the power to be consumed into account, the system 100 can be prevented from being shut down.

Figure 7A:
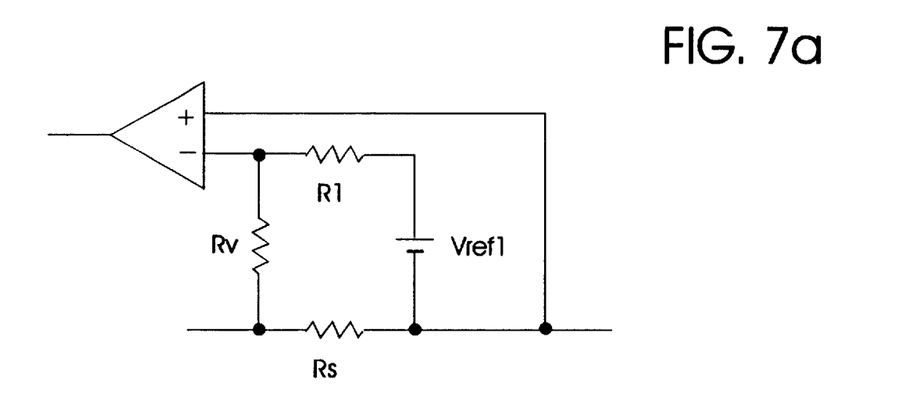
in FIG. 7(a) is shown an equivalent circuit for an input section of a differential amplifier used in the AC/DC adaptor of FIG. 4, in FIG. 7(b) is shown an equivalent circuit during the constant voltage operation, and in FIG. 7(c) is shown an equivalent circuit during the constant current operation.
Figure 7B:
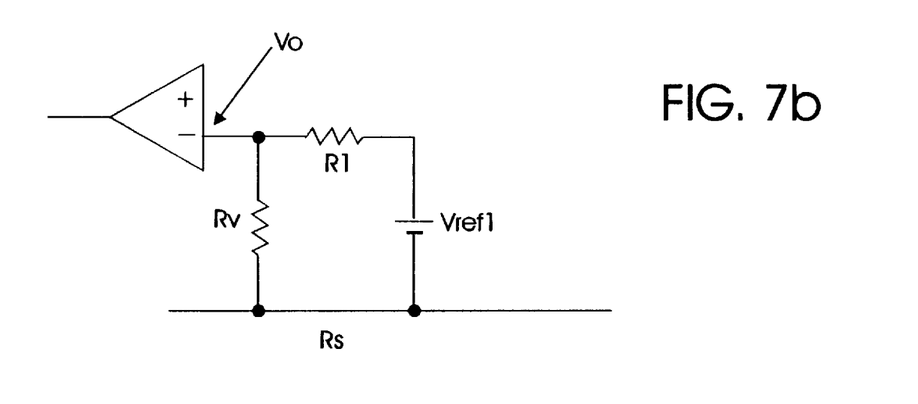
Figure 7C:
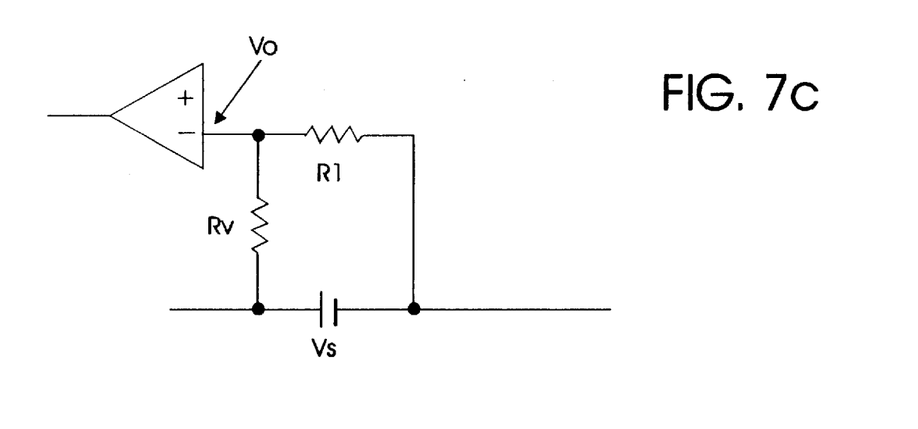

FIG. 7(a) is a diagram showing an equivalent circuit, at the input portion of the differential amplifier 21, that is included in the constant current feedback control means. Since in the CV operational mode the differential amplifier 21 outputs nothing and a current does not substantially flow across the current detection resistor $R_2$, the circuit shown in FIG. 7(a) is the equivalent of that in FIG. 7(b). Therefore, voltage $V_0$ at the inversion side input terminal of the differential amplifier 21 is represented by expression (5). Since in the CC operational mode the differential amplifier 21 has an output and the current $I_{out}$ flows across the current detection resistor $R_2$, the state of the resistor $R_2$ is equivalent to that when electromotive force $V_S(=I_{out}R_2)$ is applied to it, as is shown in FIG. 7(c). The voltage $V_0$ at the inversion side input terminal of the differential amplifier 21 is, therefore, represented by expression (6).

Expression (5):

$$V_0 = \frac{R_V}{R_1 + R_V} V_{ref1}$$

Expression (6):

$$V_0 = I_{out} + R_S$$

In the AC/DC adaptor 10 shown in FIG. 4, simultaneous equations (5) and (6) must be established so that the operations of the constant current feedback control means and the constant voltage feedback control means exchange when the output current $I_{out}$ reaches a predetermined value. When $V_0$ is removed from both equations, expression (1) is obtained.

The present invention has been described in detail while referring to the specific embodiment. However, it should be obvious to one having ordinary skill in the art that various modifications or revisions of the embodiment are possible within the scope of the present invention. That is, although the present invention has been disclosed by using an example, it should not be limited to that example. To understand the subject of the present invention, the claims should be referred to.

As is described in detail, even when the supplied power is reduced in consonance with a reduction in size, the AC/DC adaptor that embodies the present invention can provide a large supply of power momentarily when power that is extraordinarily greater than that which is employed for normal operation is required due to an in-rush current, for example. Thus, an electronic device can be activated and an un-anticipated shut down can be prevented. Since a great amount of power is output for only a moment, as needed, and since the operation mode is immediately returned to a low power operation mode, there is no influence due to the heat generation that is caused by extraordinarily large supply of power, and the size of the AC/DC adaptor does not need to be increased to provide a countermeasure for the discharge of heat.

What is claimed is:

1. A power supply unit for momentarily supplying an in-rush power to an electronic device and then changing to a lower power constant voltage/constant current state, comprising:

a converter converting an alternating current input terminal electrical voltage into a direct current output terminal electrical voltage;

a voltage control operatively connected to said converter and keeping said output terminal electrical voltage at a first voltage value $V_1$ until said output terminal current is increased up to a first current value $I_1$ at which time said first voltage value $V_1$ is decreased, said first current value $I_2$ being supplied momentarily to activate said electronic device;

a first current control operatively connected to said converter and keeping said output terminal current at said first current value $I_1$ while said output terminal voltage decreases from said first voltage value $V_1$ to a second voltage value $V_2$ where said second voltage value $V_2$ is less than said first voltage value $V_1$;

said first current control being further operative to decrease said output terminal current from said first current value $I_1$ to a second current value $I_2$ where $I_2$ is less than $I_1$ when said output terminal voltage reaches said second voltage value $V_2$; and a second current control operatively connected to said converter and keeping said output terminal current at said second current value $I_2$ while said output terminal voltage is maintained at a voltage which is equal to or lower than said second voltage value $V_2$.

2. The power supply unit of claim 1, further comprising:

a voltage detector operatively connected with said converter and detecting said output terminal voltage;

a current detector operatively connected with said converter and detecting said output terminal current;

said voltage control including a constant voltage feedback control operatively connected with said converter and said voltage detector and keeping said output terminal voltage constant by feeding back a difference between said output terminal voltage and a reference voltage;

said first current control including a constant current feedback control operatively connected with said converter and said current detector and keeping said output terminal current constant by feeding back a difference between said output terminal current and a reference current; and a reference current change circuit operatively connected with said voltage detector and said constant current feedback control and varying said reference current in consonance with detected output terminal voltage.

3. A power supply unit according to claim 2, wherein constant voltage feedback control is given priority when said output current is lower than said reference current, and constant current feedback control is given priority when said output terminal voltage is lower than said reference voltage.

4. A method for momentarily supplying an in-rush power to an electronic device and then supplying a constant voltage/constant current lower power, comprising the steps of:

a) converting alternating current electrical voltage delivered at an input terminal into direct current electrical voltage delivered at an output terminal while;

b) keeping output terminal voltage at a constant first voltage value $V_1$ until an output current is increased up to a first current value $I_1$;

c) keeping said output current at said first current value $I_1$ while decreasing said output voltage from said first voltage value $V_1$ to a second voltage value $V_2$ where said second voltage value $V_2$ is less than said first voltage value $V_1$;

d) keeping said output terminal voltage at said second voltage value $V_2$ while decreasing said output terminal current from said first current value $I_1$ to a second current value $I_2$ where the second current value $I_2$ is less than the first current value $I_1$; and e) keeping output terminal current at said second current value $I_2$ when output terminal voltage is below said second voltage value $V_2$.

5. The method of claim 4, further including the steps of:

a) detecting current delivered at the output terminal;

b) keeping the output current at a constant value by feeding back a difference between a detected value of output current and a reference current value;

c) detecting voltage delivered at the output terminal; and d) changing the reference current value in consonance with detected output terminal voltage.

* * * * *